(12) United States Patent
Mahoney et al.

(10) Patent No.: US 11,456,566 B2
(45) Date of Patent: Sep. 27, 2022

(54) COAXIAL CONNECTOR SEIZURE ASSEMBLY WITH INTEGRATED MECHANICAL STOP AND A HYBRID FIBER-COAXIAL (HFC) MODULE IMPLEMENTING SAME

(71) Applicant: Applied Optoelectronics, Inc., Sugar Land, TX (US)

(72) Inventors: William G. Mahoney, Suwanee, GA (US); Simon Farfoud, Hoschton, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 313 days.

(21) Appl. No.: 16/810,517

(22) Filed: Mar. 5, 2020

(65) Prior Publication Data

US 2021/0281026 A1 Sep. 9, 2021

(51) Int. Cl.
| | |
|---|---|
| *H01R 13/52* | (2006.01) |
| *H01R 24/52* | (2011.01) |
| *H01R 24/54* | (2011.01) |
| *H01R 13/631* | (2006.01) |
| *H01R 13/642* | (2006.01) |

(52) U.S. Cl.
CPC ........... *H01R 24/52* (2013.01); *H01R 13/631* (2013.01); *H01R 13/642* (2013.01); *H01R 24/545* (2013.01)

(58) Field of Classification Search
CPC .... H01R 13/631; H01R 13/642; H01R 24/50; H01R 24/52; H01R 24/545; G02B 6/4448; G02B 6/3817

USPC .................................................. 439/578, 582
See application file for complete search history.

(56) References Cited

U.S. PATENT DOCUMENTS

| | | | | |
|---|---|---|---|---|
| 5,131,868 A | * | 7/1992 | Forterre | H01R 9/0521 439/582 |
| 5,277,590 A | * | 1/1994 | Thomas | H01R 13/646 439/582 |
| 6,126,482 A | * | 10/2000 | Stabile | H01R 24/545 439/582 |
| 6,309,251 B1 | * | 10/2001 | Tang | H01R 9/05 439/263 |
| 7,419,403 B1 | * | 9/2008 | Paynter | H01R 24/44 439/578 |

(Continued)

*Primary Examiner* — Marcus E Harcum
(74) *Attorney, Agent, or Firm* — Grossman Tucker Perreault & Pfleger, PLLC; Norman S. Kinsella (57) ABSTRACT

A coaxial seizure assembly is disclosed that includes an integrated mechanical stop that prevents over-insertion and maintains a nominal/expected impedance value to enable high-frequency switching, e.g., 1.8-3 Ghz or greater. In more detail, the coaxial seizure assembly includes a coaxial receptacle defined by an opening configured to at least partially receive and couple to a coaxial connector. The opening communicates with a seizure cavity defined within the coaxial seizure assembly. A radio frequency (RF) interconnect at least partially extends into the seizure cavity, with the RF interconnect having a first end to electrically couple to an electrical component and a second end that extends a predetermined angle relative to the first end, e.g., substantially 90 degrees. The second end defines a mating surface that aligns within the seizure cavity such that an imaginary line drawn along an insertion path of a coaxial cable conductor pin intersects with the mating surface.

13 Claims, 6 Drawing Sheets

(56) References Cited

U.S. PATENT DOCUMENTS

| | | | | |
|---|---|---|---|---|
| 8,047,872 B2* | 11/2011 | Burris | H01R 24/54 | 439/582 |
| 8,992,250 B1* | 3/2015 | Hosier, Sr. | H01R 13/622 | 439/582 |
| 9,891,395 B2* | 2/2018 | Lin | H04B 10/506 | |
| 10,044,441 B2* | 8/2018 | Jones | H04B 10/6931 | |
| 10,073,229 B2* | 9/2018 | Ho | H04B 10/40 | |
| 10,175,431 B2* | 1/2019 | Lin | G02B 6/4215 | |
| 10,218,123 B1* | 2/2019 | Mahoney | H01R 12/712 | |
| 10,992,484 B2* | 4/2021 | Hazani | H04W 52/04 | |
| 2003/0224658 A1* | 12/2003 | Koch | H01R 9/0518 | 439/582 |
| 2004/0058582 A1* | 3/2004 | Wendling | H01R 9/0518 | 439/582 |
| 2004/0137790 A1* | 7/2004 | Lee | H01R 4/28 | 439/582 |
| 2006/0153362 A1* | 7/2006 | Bloodworth | H02G 3/08 | 379/413.02 |
| 2007/0272440 A1* | 11/2007 | Grunwald | H04M 1/0293 | 361/752 |
| 2009/0186522 A1* | 7/2009 | Henningsen | H01R 24/545 | 439/582 |
| 2009/0196630 A1* | 8/2009 | Ishaug | H04B 10/697 | 398/193 |
| 2009/0310927 A1* | 12/2009 | Riggsby | G02B 6/4471 | 385/135 |
| 2010/0173523 A1* | 7/2010 | Magnezi | H01R 9/0506 | 439/582 |
| 2014/0199886 A1* | 7/2014 | Nugent | H01R 9/05 | 439/582 |
| 2015/0011120 A1* | 1/2015 | Goebel | H01R 4/48 | 439/578 |
| 2015/0280374 A1* | 10/2015 | Hosier, Sr. | H01R 24/542 | 439/582 |
| 2019/0273331 A1* | 9/2019 | Mahoney | H01R 24/40 | |
| 2021/0013668 A1* | 1/2021 | Rahm | G02B 6/445 | |
| 2021/0258076 A1* | 8/2021 | Magnezi | H01R 31/02 | |

* cited by examiner

COAXIAL CONNECTOR SEIZURE ASSEMBLY WITH INTEGRATED MECHANICAL STOP AND A HYBRID FIBER-COAXIAL (HFC) MODULE IMPLEMENTING SAME

TECHNICAL FIELD

The present disclosure relates generally to communication systems, and more particularly, to a coaxial connector seizure assembly that includes an integrated mechanical stop to ensure proper insertion distance of an associated coaxial center pin, and a hybrid fiber-coaxial (HFC) module implementing same.

BACKGROUND INFORMATION

Broadband networks implemented with hybrid fiber-coaxial (HFC) architecture convert inbound light signals to RF energy, and outbound RF energy back to light signals. Such broadband networks can deliver Internet and cable television services (CATV). HFC architecture generally includes a fiber optic backbone formed from a plurality of HFC optical nodes, which are also referred to as optical nodes, HFC nodes, or simply nodes. HFC nodes get disposed at predetermined geographic locations to service N number of end-user homes and businesses.

HFC nodes include an inbound side coupled to one or more optical fibers for receiving optical signals, and an outbound side (or return side) that includes four (4) coaxial connector ports with a coaxial seizure fitting/assembly. Return signals get received by an HFC node via the coaxial connector ports, and then diplexed and combined by optical converters within the HFC node. Accordingly, RF signals get converted to light and transmitted to an HFC hub node with the hub node orchestrating transmissions to/from each end-user home/location.

HFC architecture transcended the limitations of prior CATV systems by eliminating the necessity of long amplifier cascades, and by providing greater fault tolerance and limiting outages to a relatively small number of end-users. However, the demand for more channels, higher-quality content, and high-speed data-services continues to push existing HFC systems to their limits. In response, cable television operators have adopted the Data Over Cable Service Interface Specification to standardize continued improvements of existing HFC networks in order to provide additional bandwidth for enhanced TV and Internet services.

Changes in DOCSIS 3.1 (2017) introduced so-called "Full Duplex DOCSIS" under the brand DOCSIS® 3.1 technology to allow for broadband speeds of 10 Gbps downstream and 1 Gbps upstream. The same technology now appears in the DOCSIS 4.0 specification (published in 2019) under the brand DOCSIS® 4.0 technology. The DOCSIS® 4.0 technology now aims to achieve upstream speeds up to 10 Gbps to provide high-capacity symmetric data services. The introduction and deployment of DOCSIS® 4.0 technology into existing HFC networks has raised numerous non-trivial challenges.

BRIEF DESCRIPTION OF THE DRAWINGS

These and other features and advantages will be better understood by reading the following detailed description, taken together with the drawings wherein.

DETAILED DESCRIPTION

As discussed above, cable operators face numerous non-trivial challenges in deploying and updating HFC networks that comport with the bandwidth demands of DOCSIS® 4.0 technology and beyond. Such challenges include predictable network-wide increase in service degradations due to a range of factors that get exacerbated by higher-frequency transmissions including insertion loss, noise, and power losses due to transmission path lengths. In addition, existing HFC nodes, taps, and amplifiers also contribute to service degradation when participating in HRC networks that operate at transmission frequencies of 1.8 to 3 GHz, e.g., to comport with DOCSIS® 4.0.

One particular challenge facing such devices relates to the coaxial connector ports that allow for coupling of standard coaxial connectors. HFC nodes generally include spring-loaded seizure mechanisms that exert a substantially uniform force on the center conductor pin of a coaxial cable (also referred to herein as a center pin), such as shown in the cross-sectional view of FIG. 1. As shown, the HFC node 102 includes a receptacle 103 to receive a coaxial connector 104. The HFC node 102 further includes a spring-loaded member 108 aligned within the receptacle 103 to supply a bias force against the center pin 110 in response to the insertion of the coaxial connector 104 into the receptacle 103. The bias force displaces the center pin 110 towards RF pin 106, thus "seizing" the center pin 110 and electrically connecting the same with the RF pin 106, and by extension, an associated amplifier device (not shown). This spring-loaded seizing mechanism advantageously reduces the potential for improper or incorrect insertion during field deployments, e.g., based on torque variation introduced by field technicians.

Figure 1:
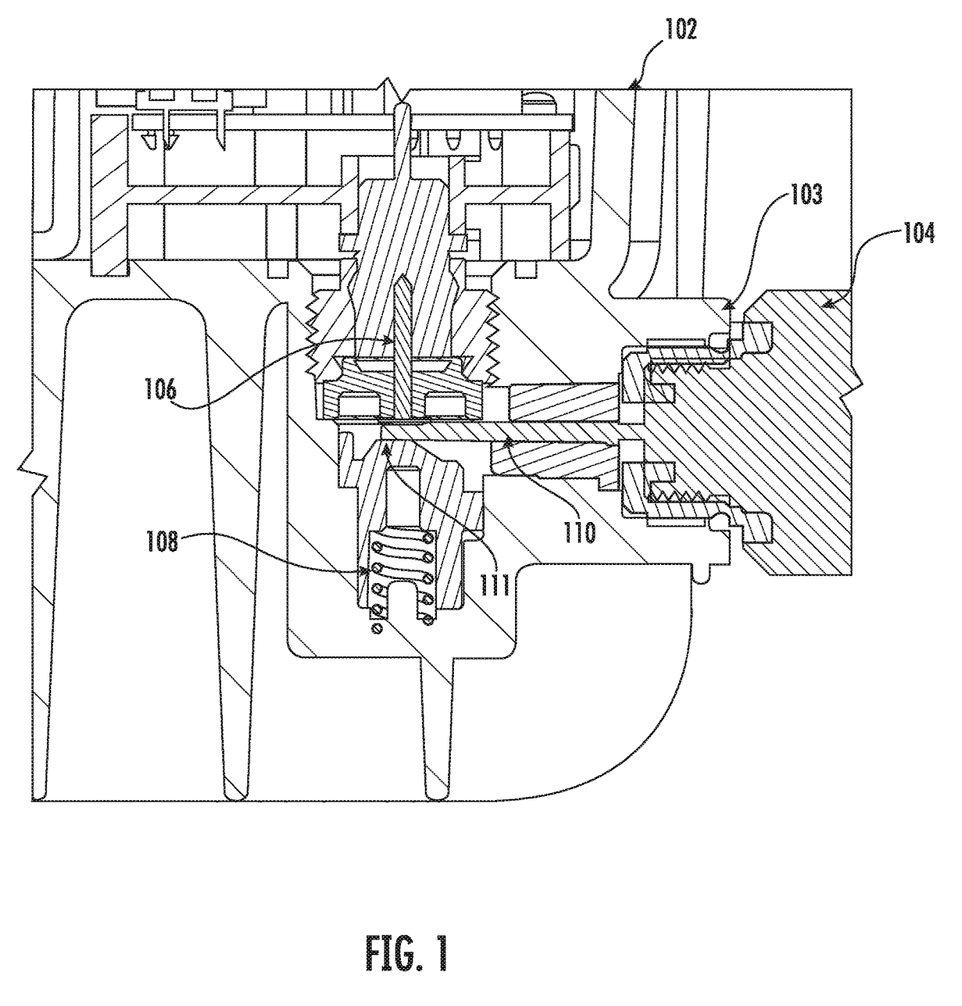
FIG. 1 shows a cross-sectional view of an example spring-based coaxial connector seizure assembly of an HFC node.

However, this disclosure has recognized that the existing seizure mechanisms/assemblies do not account for variations in the overall length of center pin 110 and/or the potential for over-insertion into the receptacle 103. For example, over-insertion of center pin 110 into the receptacle such that end 111 extends beyond RF pin 106, even as little as 1 mm, can significantly degrade signaling performance when operating at frequencies in the 1.8-3 GHz range. This is due, at least in part, to resulting impedance changes and the tendency of such high-frequency signaling to induce a capacitor-like response by the center pin 110.

Continued improvement and deployment of HFC networks capable of satisfying DOCSIS® 4.0 requirements, as well as any other communication system that aims to support pluggable coaxial connectors and signaling frequencies up to and beyond 1.8 Ghz, depends at least in part on a seizure assembly that mechanically remains compatible with existing coaxial connectors and that reduces or otherwise eliminates signal degradation due to improper coaxial connector insertion.

Thus, in accordance with an embodiment, a coaxial seizure assembly for use in HFC devices is disclosed that includes an integrated mechanical stop that prevents over-insertion and maintains a nominal/expected impedance value to enable high-frequency switching, e.g., 1.8-3 Ghz or greater. In more detail, a coaxial seizure assembly consistent with the present disclosure includes a coaxial receptacle defined by an opening configured to at least partially receive and couple to a coaxial connector. The opening communicates with a seizure cavity defined within the coaxial seizure assembly. A radio frequency (RF) interconnect at least partially extends into the seizure cavity, with the RF interconnect having a first end to electrically couple to an electrical component (e.g., an amplifier) and a second end that extends a predetermined angle relative to the first end, e.g., substantially 90 degrees. The second end defines a mating surface that aligns within the seizure cavity based on the predetermined angle such that an imaginary line drawn along an insertion path of a coaxial cable conductor pin intersects with the mating surface of the RF interconnect. Accordingly, the conductor pin "bottoms out" against the mating surface once inserted into the seizure cavity.

A coaxial seizure assembly consistent with the present disclosure therefore provides a relatively simple alignment and seizure mechanism that significantly reduces the potential of over-insertion of a conductor pin into a seizure cavity. In addition, the integrated mechanical stop provided by the RF interconnect within the seizure cavity provides tactile feedback to a technician that intuitively indicates successful insertion and electrical interconnection between a coaxial cable and the HFC node/device.

While the following discussion and figures describe and show a coaxial seizure assembly for use in HFC devices, this disclosure is not limited in this regard. Coaxial seizure assemblies consistent with the following disclosure can be implemented in any device that supports coaxial cable connections with minor modification.

Figure 2:
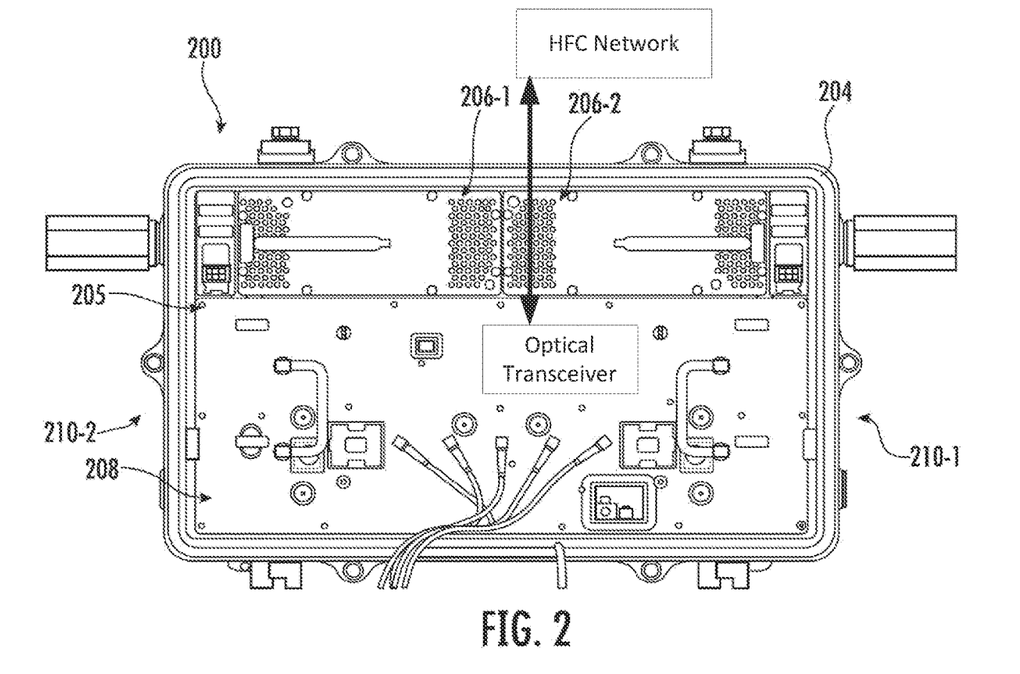
FIG. 2 shows a perspective view of an example HFC node implementing a coaxial connector seizure assembly in accordance with an embodiment of the present disclosure.
Figure 3:
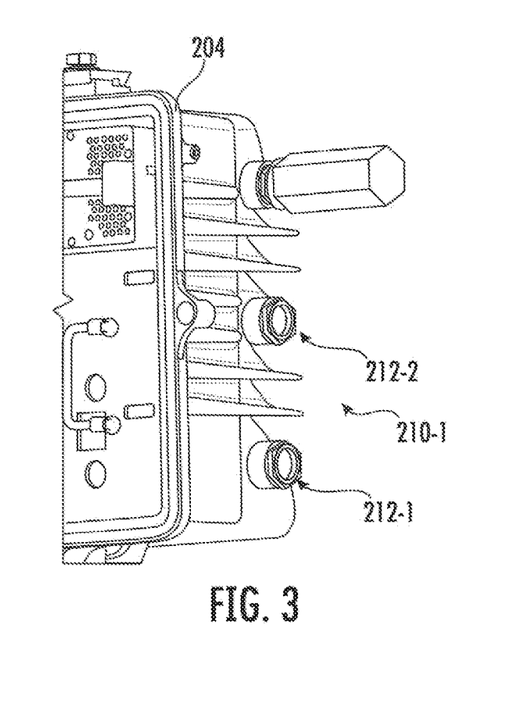
FIG. 3 shows a side view of the HFC node of FIG. 2 in accordance with an embodiment of the present disclosure.
Figure 4:
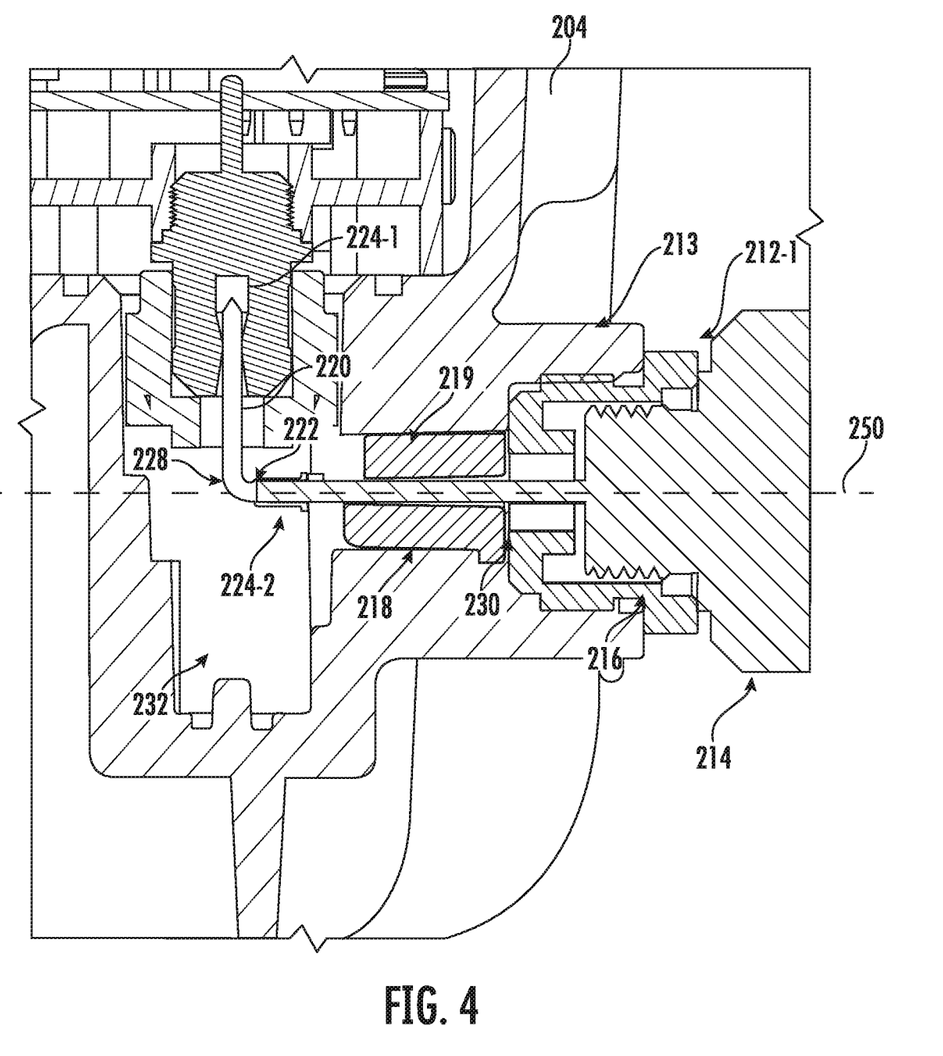
FIG. 4 shows a cross-sectional view of the HFC node of FIG. 2 in accordance with embodiments of the present disclosure.

Turning to the figures, FIGS. 2-4 show an example HFC node 200 consistent with embodiments of the present disclosure. As shown, the HFC node 200 includes a housing 204 with a cover panel omitted for clarity. The housing 204 includes a plurality of sidewalls that define a cavity 205. The cavity 205 includes first and second power supplies 206-1, 206-2, and an optical-electrical conversion arrangement 208 disposed therein. The cavity 205 further includes a multi-channel optical transceiver module (shown schematically) having a transmitter optical subassembly (TOSA) and receiver optical subassembly (ROSA) for sending and receiving optical signals, e.g., from an associated HFC network (shown schematically). The optical transceiver arrangement may also be referred to herein as simply an optical line card.

The housing 204 further includes first and second coaxial interfaces 210-1, 210-2, disposed on opposite sides of the housing 204. The first and second coaxial interfaces 210-1, 210-2 may also be referred to collectively as RF input-output (TO) interface. Each of the first and second coaxial interfaces 210-1, 210-2 provide at least one coaxial coupling receptacle, which may also be referred to herein as coaxial seizing receptacles, or simply coaxial receptacles. As shown more clearly in FIG. 3, the first coaxial interface 210-1 includes a plurality of coaxial receptacles, namely first and second coaxial receptacles 212-1, 212-2.

Each of the first and second coaxial receptacles 212-1, 212-2 electrically couple an inserted coaxial cable, and more particularly, a conductor pin of an inserted coaxial cable, to the optical-electrical conversion arrangement 208. The conductor pin of a coaxial cable may also be referred to herein as center conductor pin, or simply a center pin. As discussed below, each of the first and second coaxial receptacles 212-1, 212-2 implement a coaxial seizure assembly to ensure proper insertion and electrical coupling of inserted coaxial cables to the optical-electrical conversion arrangement 208.

The optical-electrical conversion arrangement 208 electrically couples to each of the first and second coaxial receptacles 212-1, 212-2 by way of an RF interconnect. The following discussions and figures illustrate and describe the RF interconnect as an RF interconnect pin, but other RF interconnect device shapes and configurations are within the scope of this disclosure.

The optical-electrical conversion arrangement 208 also operatively couples to the aforementioned optical line card. The optical-electrical conversion arrangement 208 includes hardware (e.g., circuitry, microcontrollers, etc.), software (e.g., firmware, assembly code, and so on), or a combination of both to provide an interconnect/cross-connect between the first and second coaxial interfaces 210-1, 210-2, and the optical line card.

Thus, in operation, the optical-electrical conversion arrangement 208 converts inbound optical signals received from the HFC network by way of the line card to electrical RF signals, referred to herein as simply RF signals, for output via the first and/or second coaxial interfaces 210-1, 210-2. In addition, the optical-electrical conversion arrangement 208 converts output RF signals received via the first and second coaxial interfaces 210-1, 210-2 to optical signals for transmission on the HFC network by way of the optical line card.

Turning specifically to FIG. 4, a cross-sectional view shows an example embodiment of the first coaxial receptacle 212-1. The first coaxial receptacle 212-1 includes a body 213, which maybe integrally formed with the housing 204 as a single piece or formed from multiple pieces. Preferably, the body 213 is separable from the housing 204 to allow for modular re-use of the same in multiple different types of HFC devices that couple to coaxial cables. In such cases, the body 213 may be integrally formed as a single piece, e.g., have a monolithic body, or from multiple pieces. The body 213 can comprise, for example, metal, plastic, or any other suitably rigid material. As discussed below, the body 213 provides electrical shielding to reject, for instance, external electrical interference and other noise.

The body 213 defines an opening 216 that transitions or is otherwise in communication with a seizure cavity 218. Interior surfaces of the body 213 define the seizure cavity 218. The seizure cavity 218 includes a longitudinal axis 250 that extends substantially parallel with, for instance, conductor pin 230 of the coaxial cable 214. The longitudinal axis 250 also generally defines the insertion path which the conductor pin 230 travels during insertion.

The seizure cavity 218 can further include insulating material such as insulator member 219. The insulator member 219 can include a body formed of a metal or other suitable material capable of providing electrical shielding. The insulator member 219 at least partially surrounds the conductor pin 230 of the coaxial cable when inserted into the seizure cavity 218.

As further shown, an RF interconnect 220 extends at least partially into the seizure cavity 218 to provide electrical interconnection between the conductor pin 230 of the coaxial cable 214 and an associated electrical component of the optical-electrical conversion arrangement 208, e.g., an amplifier device. The RF interconnect 220 may be implemented having a body with a pin-type configuration, and therefore may also be referred to as an RF pin interconnect, or simply an RF pin. The body of the RF interconnect 220 comprises an electrically conductive material such as a metal or metal alloy. The body of the RF interconnect 220 may be integrally formed as a monolithic structure from a single piece of material, or from multiple pieces.

In the embodiment shown in FIG. 4, the RF interconnect 220 includes a first end 224-1 that defines a first section for electrically coupling to the associated electrical component of the optical-electrical conversion arrangement 208. The RF interconnect 220 further includes a second end 224-2, disposed opposite the first end 224-1, that defines a second section for electrically coupling to the conductor pin 230 of the coaxial cable 214, e.g., by way of mating surface 222 as discussed below.

The first and second ends 224-1, 224-2 extend substantially transverse from each other at a predetermined angle, e.g., at substantially 90 degrees. At least a first bend 228 along the RF interconnect 220 can provide the predetermined angle. Preferably, the first bend 228 has an associated bend radius of 45±2 degrees, such as shown, which minimizes or otherwise reduces return loss and impedance mismatch issues that can result from less-gradual bends, e.g., 90-degree right-angle bends. Accordingly, the first bend 228 can include a relatively smooth curve that reduces reflection and also achieves a relatively stable transmission line impedance.

The RF interconnect 220 may be formed with the first bend 228, or the first bend 228 may be introduced after manufacture and prior to installation into the HFC node, e.g., via a manual user-supplied force, or with a mechanical bending device.

The second end 224-2 may further optionally define a sleeve 234. The sleeve 234 can include a substantially cylindrical shape that forms a socket for receiving an end of the center pin 230 of the coaxial cable 214, an example of which is shown more clearly in FIG. 5. The mating surface 222 defines at least a portion of the socket and operates as a mechanical stop, as discussed in further detail below. The socket of the sleeve 234 can include an overall diameter that measures substantially equal to or less than the diameter of the conductor pin 230 of the coaxial cable 214. The sleeve 234 can further include curved sidewalls that define a lip 238 at the socket opening to allow for greater tolerances when inserting of the center pin 230. The sleeve 234 may therefore receive and form a friction fit with the center pin 230 and provide up to, for instance, 360 degrees of direct electrical engagement.

Continuing on, the RF interconnect 220 can be securely held in alignment within the seizure cavity 218 by, for instance, alignment/insulation member 232, which is discussed in greater detail below. This alignment includes the mating surface 222 being disposed at a location that allows for a longitudinal center line (e.g., shown generally at 250) of the seizure cavity 218 to extend therethrough, e.g., based on the predetermined angle of the first bend 228. Alternatively, alignment includes the mating surface 222 being disposed at a location within the seizure cavity 218 that allows for an imaginary line drawn along an insertion path for the conductor pin 230 through the same to intersect with the mating surface 222. Preferably, alignment of the mating surface 222 within the seizure cavity 218 includes a position that allows for the second end 224-2 of the RF interconnect 220 to radially and axially align with conductor pin 230 of the coaxial cable 214. This axial and radial alignment allows for an end of the center pin 230 of the coaxial cable 214, and more specifically a surface at the end of the center pin 230, to directly engage mating surface 222.

Accordingly, the RF interconnect 220 operates as an electrical interconnect as well as a mechanical stop that limits insertion of the conductor pin 230 of the coaxial cable 214 to a predefined distance. This advantageously eliminates or otherwise reduces the potential for the conductor pin 230 to be inserted beyond the predefined position that achieves nominal electrical coupling, e.g., that maintains nominal impedance at the coaxial connector. Moreover, the RF interconnect 220 provides a tactile response to a user/technician as the center pin 230 "bottoms out" against mating surface 222 and resists further insertion.

Continuing on, the seizure cavity 218 optionally includes an insulation/alignment member 232 disposed therein, which may also be referred to herein as an insulation member. The insulation member 232 comprises plastic or other suitable dielectric material. The insulation member 232 includes a body that defines a channel/groove to allow the RF interconnect to at least partially be received. The channel further includes a bend/angle that corresponds with the predetermined angle of the RF interconnect 220. Thus, the insulation member 232 can securely hold the RF interconnect 220 in alignment within seizure cavity 218 as discussed above.

Figure 5:
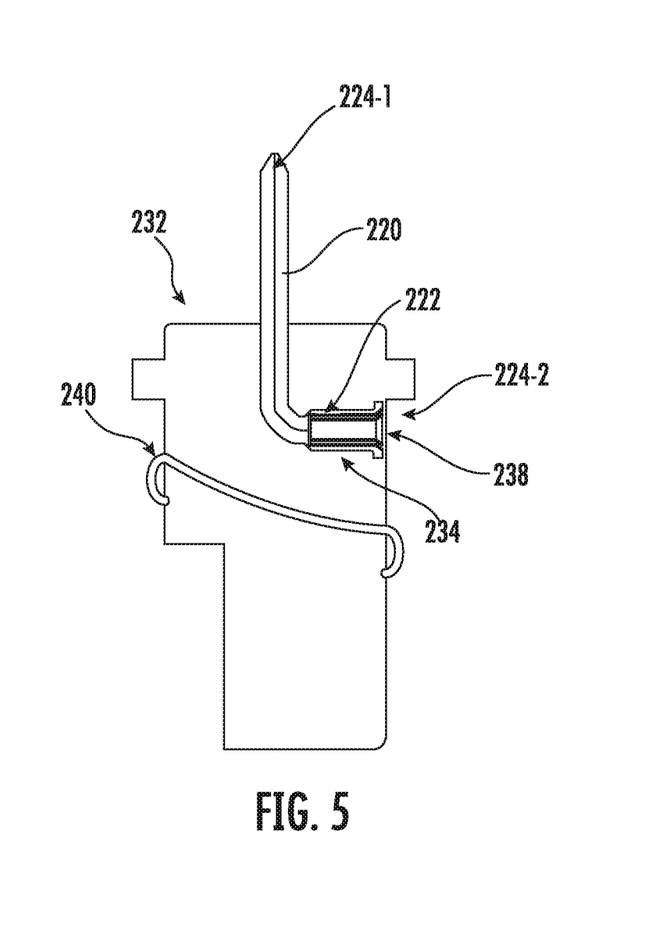
FIG. 5 shows a cross-sectional view of an insulating member with an integrated RF interconnect device for use in one or more coaxial connector seizure assemblies of the HFC node of FIG. 2, in accordance with an embodiment.
Figure 7:
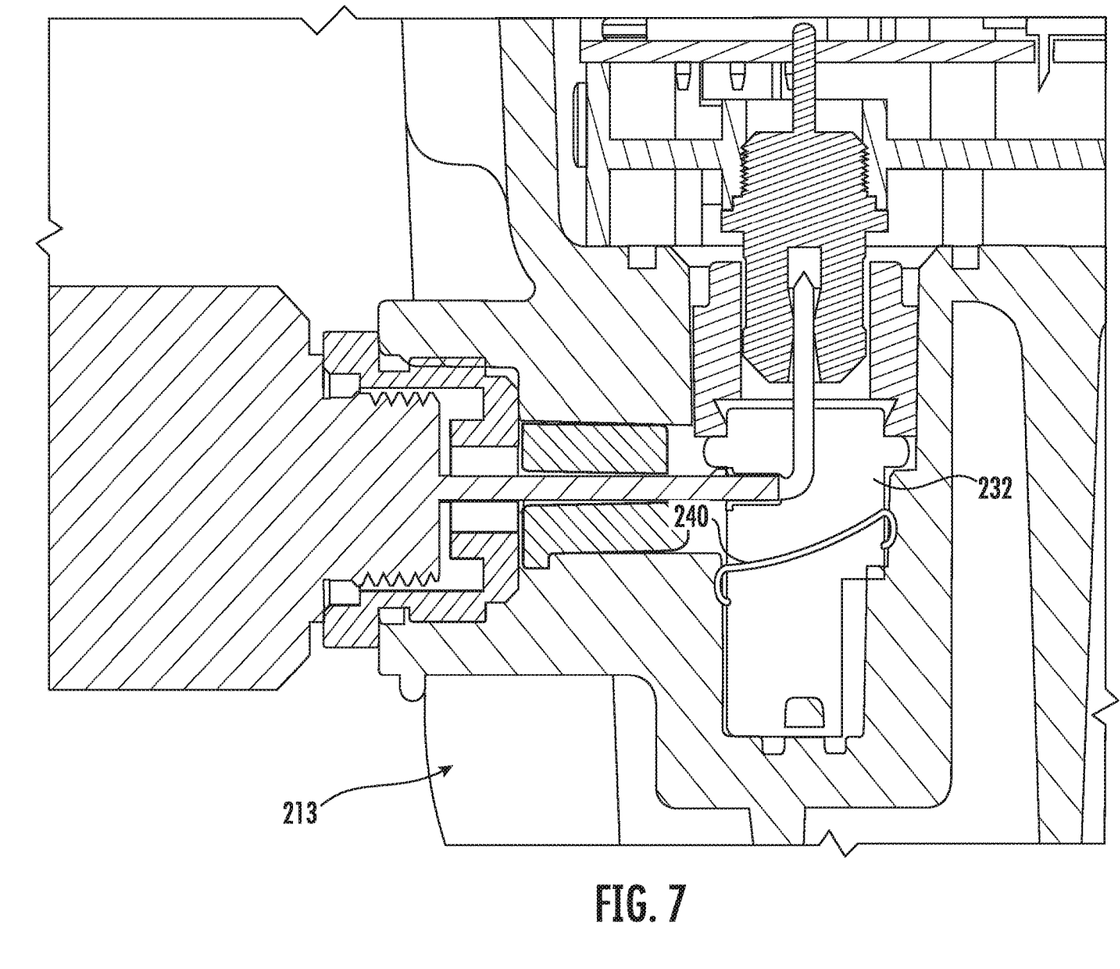
FIG. 7 shows the insulating member of FIG. 6 implemented within a seizure cavity of the HFC node of FIG. 2, in accordance with an embodiment.

Turning to FIG. 5, the insulation member 232 is shown with an optional ground plane interconnect 240, which may also be referred to as a ground interconnect. As shown, the ground interconnect 240 can extend at least partially though the body of the insulation member 232. The ground interconnect can include a portion that extends from the body of the insulation member 232 to electrically couple (e.g., directly) with sidewalls of an associated coaxial seizure assembly and/or node housing, e.g., housing 204. For example, as shown in the example embodiment of FIG. 7, the ground interconnect 240 electrically couples at each end with surfaces that define the body 213. The ground interconnect 240 allows for grounding of noise and other interference that would otherwise degrade signaling.

Figure 6:
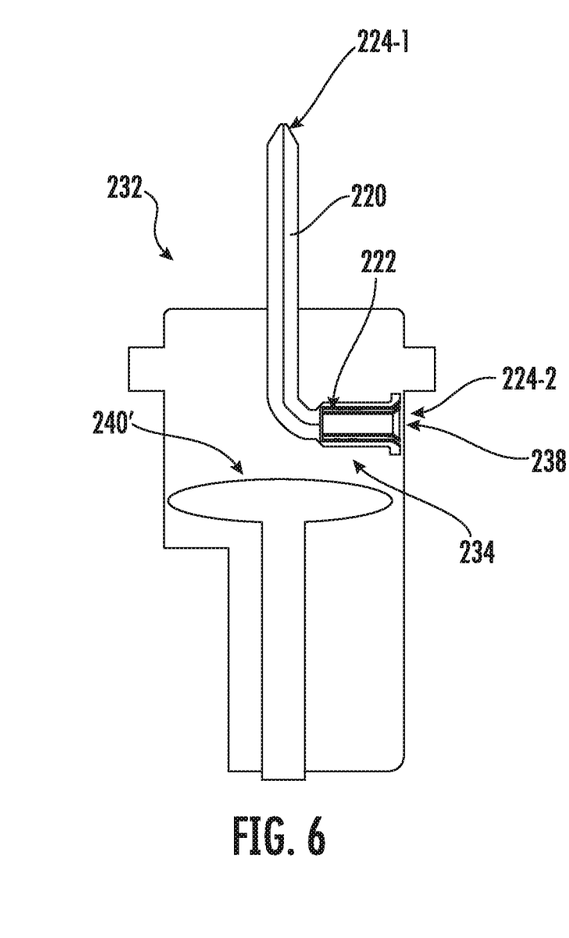
FIG. 6 shows another cross-sectional view of an insulating member with an integrated RF interconnect device for use in one or more coaxial connector seizure assemblies of the HFC node of FIG. 2.

FIG. 6 shows another example embodiment of the insulation member 232. As shown, a ground interconnect 240' disposed within the insulation member 232 includes a T-shaped configuration including a round plate/disk section that is supported by a stem. The stem can make contact and electrically couple with, for instance, body 213. The stem therefore provides a ground interface adjacent the center conductor of the coaxial cable. Note, the round/plate section may also extend from the insulation member 232 and electrically couple with body 213 to increase grounding contact. For instance, as shown the stem and/or round plate can electrically couple to, for instance, sidewalls defining the body 213 for grounding purposes. As shown in FIG. 6, the stem extends at least partially from the insulation member 232 to achieve such electrical coupling.

Figure 8:
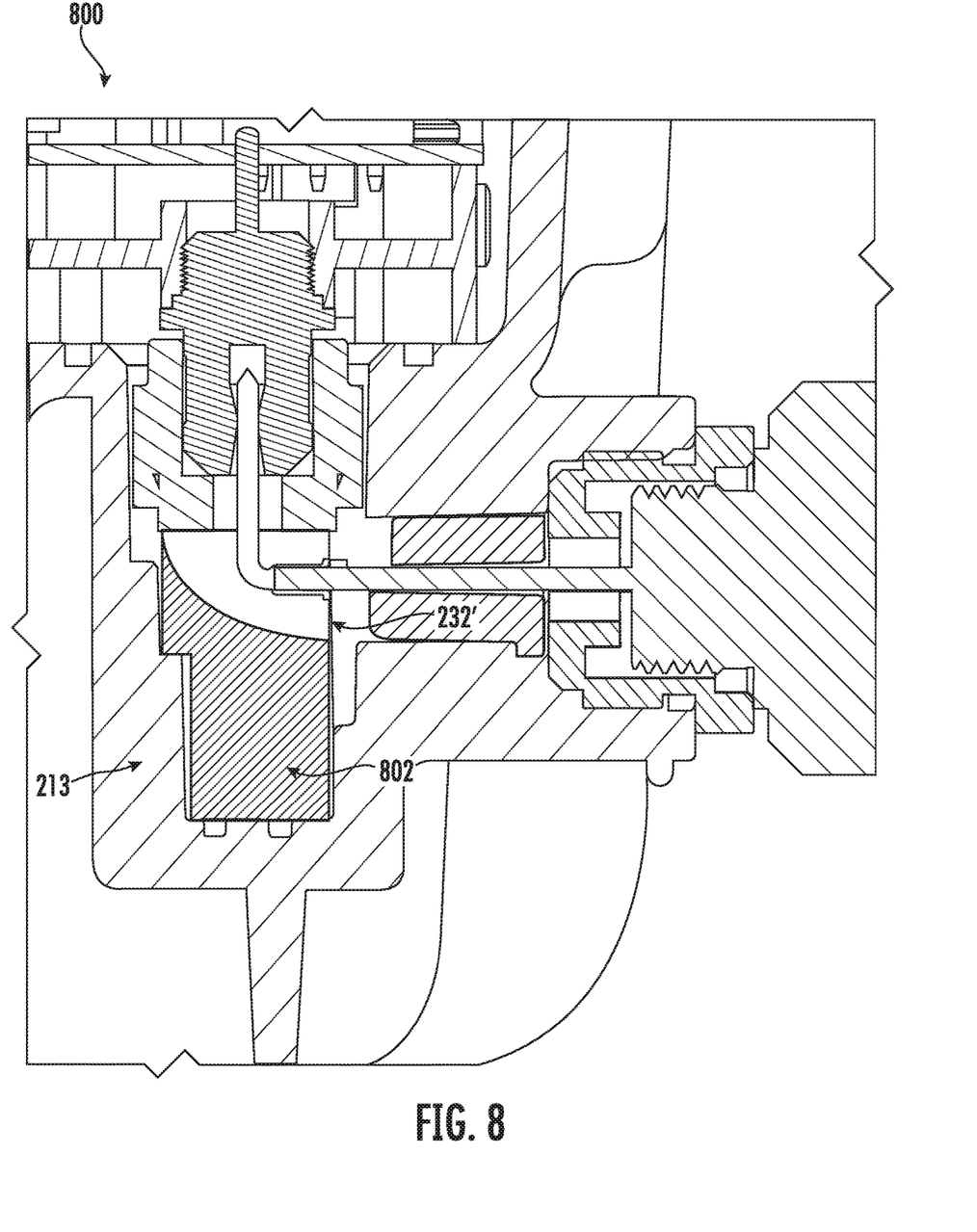
FIG. 8 shows another cross-sectional view of an HFC node in accordance with an embodiment of the present disclosure.

FIG. 8 shows a cross-sectional view of another HFC node in accordance with an embodiment. As shown, the body 213 includes a seizure cavity that includes a metal grounding member 802. The metal grounding member 802 may be formed of the same material as the body 213, or a different material. In an embodiment, the metal grounding member 802 comprises aluminum.

As further shown, the metal grounding member 802 includes a sloped/curved mating surface to couple to and support insulation member 232'. The insulation member 232' may be configured substantially similar to that of the insulation member 232 discussed above, the details of which will not be repeated for brevity. However, as shown the insulation member 232' includes a curved body that corresponds with the sloped/curved mating surface of the metal grounding member 802.

In accordance with an aspect of the present disclosure a coaxial seizure assembly is disclosed. The coaxial seizure assembly comprising a coaxial receptacle defined by an opening that transitions to a seizure cavity, the coaxial receptacle to at least partially receive and couple to a coaxial cable, and a radio frequency (RF) pin at least partially extending into the seizure cavity of the coaxial receptacle, the RF pin including a first end to electrically couple to an electrical component and a second end defining a mating surface to electrically couple to a center pin of a coaxial cable when inserted into the seizure cavity, wherein the RF pin includes at least one bend such that the second end extends at a predetermined angle relative to the first end.

In accordance with another aspect of the present disclosure an HFC node is disclosed. The HFC node comprising an RF input-output (10) interface with at least a first coaxial receptacle to receive and removably couple to an inserted coaxial cable connector, the first coaxial receptacle comprising a body that defines a seizure cavity, an opening to at least partially receive the inserted coaxial cable connector, the opening in communication with the seizure cavity to receive a center pin of the inserted coaxial cable connector, and a radio frequency (RF) interconnect at least partially extending into the seizure cavity, the RF interconnect having a first portion to electrically couple to an electrical component of the HFC node and a second portion that provides a mating surface to electrically couple to a center pin of the inserted coaxial cable connector, wherein the second portion of the RF interconnect extends at a predetermined angle relative to the first portion of the RF interconnect, an optical transceiver arrangement to optically couple with an HFC network via one or more optical fibers, and wherein the RF TO interface and the optical transceiver arrangement are cross-connected via an optical-electrical conversion arrangement to convert inbound optical signals to electrical signals for output via the RF TO interface, and convert outbound RF signals to optical signals for transmission on the HFC network via the optical transceiver arrangement.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A coaxial seizure assembly, the coaxial seizure assembly comprising:
   a coaxial receptacle defined by an opening that transitions to a seizure cavity, the coaxial receptacle to at least partially receive and couple to a coaxial cable;
   a radio frequency (RF) pin at least partially extending into the seizure cavity of the coaxial receptacle, the RF pin including a first end to electrically couple to an electrical component and a second end defining a mating surface to electrically couple to a center pin of the coaxial cable when inserted into the seizure cavity, wherein the RF pin includes at least one bend such that the second end extends at a predetermined angle relative to the first end, wherein the coaxial receptacle and seizure cavity is defined at least in part by a first material, and wherein an alignment member is disposed within the seizure cavity, the alignment member having a body formed of a second material different from the first material, the body defining a channel configured to receive and securely hold the second end of the RF pin in alignment within the seizure cavity, and
   a ground plane interconnect disposed within the body of the alignment member.

2. The coaxial seizure assembly of claim 1, wherein the predetermined angle of the second end relative to the first end is configured to align the mating surface of the second end with the center pin of the coaxial cable such that an imaginary line drawn along an insertion path of the center pin of the coaxial cable intersects with the mating surface.

3. The coaxial seizure assembly of claim 1, wherein the second end of the RF pin is configured to axially-align with the center pin of the coaxial cable when inserted into the seizure cavity such that a surface defining an end of the center pin directly engages the mating surface of the second end of the RF pin.

4. The coaxial seizure assembly of claim 1, wherein the mating surface of the second end of the RF pin operates as a mechanical stop such that insertion of the center pin of the coaxial cable into the seizure cavity is limited to a predefined distance based on direct engagement with the mating surface.

5. The coaxial seizure assembly of claim 4, wherein direct engagement of the second end of the RF pin and the center pin provides a tactile indication to a technician of proper insertion of the coaxial cable.

6. The coaxial seizure assembly of claim 1, wherein the second end of the RF pin defines a sleeve, the sleeve aligned within the seizure cavity to receive at least a portion of the center pin of the coaxial cable when inserted into the seizure cavity.

7. The coaxial seizure assembly of claim 1, wherein the RF pin is formed as a single, mono-lithic piece of material.

8. The coaxial seizure assembly of claim 1, wherein the first material of the coaxial receptacle and seizure cavity comprises an electrically conductive material, and wherein the second material of the alignment member comprises a dielectric material.

9. The coaxial seizure assembly of claim 8, wherein the second material comprises plastic.

10. The coaxial seizure assembly of claim 1, wherein the coaxial receptacle is located in a hybrid fiber coaxial (HFC) node capable of RF signaling at frequencies up to at least 1.8 GHz.

11. A HFC node, the HFC node comprising:
    an RF input-output (TO) interface with at least a first coaxial receptacle to receive and removably couple to an inserted coaxial cable connector, the first coaxial receptacle comprising:
    a body that defines a seizure cavity;

an opening to at least partially receive the inserted coaxial cable connector, the opening in communication with the seizure cavity to receive a center pin of the inserted coaxial cable connector;

a radio frequency (RF) interconnect at least partially extending into the seizure cavity, the RF interconnect having a first portion to electrically couple to an electrical component of the HFC node and a second portion that provides a mating surface to electrically couple to a center pin of the inserted coaxial cable connector, wherein the second portion of the RF interconnect extends at a predetermined angle relative to the first portion of the RF interconnect;

a sleeve defined by the second portion of the RF interconnect, the sleeve defining a cylindrical socket with an inner diameter substantially equal to or less than a diameter of a center pin of the inserted coaxial connector;

an alignment member disposed in the seizure cavity and defining a channel to securely hold the RF interconnect in alignment within the seizure cavity such that a longitudinal center line of the seizure cavity intersects with the mating surface defined by the second portion of the RF interconnect, wherein the alignment member comprises a dielectric material, and wherein the alignment member further comprises a ground plane interconnect disposed within the dielectric material; and an optical transceiver arrangement to optically couple with an HFC network.

12. The HFC node of claim 11, wherein RF interconnect comprises an electrically conductive pin, and wherein the electrically conductive pin includes a bend between the first and second portions to provide the predetermined angle, the bend having an associated bend radius of substantially 90 degrees.

13. The HFC node of claim 11, wherein the mating surface defines a portion of the cylindrical socket, and wherein, in response to insertion of the coaxial cable connector to a predefined distance, the center pin of the inserted coaxial cable connector directly engages the mating surface within the sleeve of the cylindrical socket and electrically couples thereto.

* * * * *